United States Patent
Terao

(10) Patent No.: US 8,517,540 B2
(45) Date of Patent: Aug. 27, 2013

(54) LIQUID CRYSTAL PROJECTOR

(75) Inventor: Koichi Terao, Suwa (JP)

(73) Assignee: Seiko Epson Corporation, Tokyo (JP)

(*) Notice: Subject to any disclaimer, the term of this patent is extended or adjusted under 35 U.S.C. 154(b) by 152 days.

(21) Appl. No.: 13/071,652

(22) Filed: Mar. 25, 2011

(65) Prior Publication Data

US 2011/0242499 A1 Oct. 6, 2011

(30) Foreign Application Priority Data

Apr. 1, 2010 (JP) ................................. 2010-084911

(51) Int. Cl.
*G03B 21/18* (2006.01)

(52) U.S. Cl.
USPC .................. 353/58; 353/52; 353/54; 353/57; 353/60; 353/61; 362/294; 165/75

(58) Field of Classification Search
USPC ............... 353/31, 52–61, 100, 101, 119, 122; 165/74, 75, 104.19; 361/230, 231, 676, 678, 361/679.48, 679.5, 688, 690, 695, 697; 349/5, 349/7–9, 161; 348/771; 362/294, 373, 547
See application file for complete search history.

(56) References Cited

U.S. PATENT DOCUMENTS

| | | | |
|---|---|---|---|
| 6,350,033 B1 * | 2/2002 | Fujimori ......................... 353/61 |
| 6,618,213 B2 * | 9/2003 | Inamoto ......................... 359/889 |
| 7,188,956 B2 * | 3/2007 | Otsuka et al. ................... 353/52 |
| 7,312,973 B2 * | 12/2007 | Sekoguchi et al. ........... 361/231 |
| 7,762,674 B2 * | 7/2010 | Hirobe ............................. 353/57 |
| 7,854,900 B2 * | 12/2010 | Takeda et al. ................. 422/120 |
| 7,866,852 B2 * | 1/2011 | Kulkarni ....................... 362/294 |
| 8,251,513 B2 * | 8/2012 | Itsuki et al. ..................... 353/54 |
| 2004/0027545 A1 * | 2/2004 | Yokoyama et al. ............. 353/52 |
| 2009/0051880 A1 * | 2/2009 | Ito .................................. 353/52 |
| 2009/0086169 A1 * | 4/2009 | Nakamura ...................... 353/31 |
| 2010/0171935 A1 * | 7/2010 | Yamagishi et al. ............. 353/52 |
| 2010/0302463 A1 * | 12/2010 | Matsumoto ................... 348/744 |
| 2011/0019161 A1 * | 1/2011 | Chen et al. ...................... 353/61 |

FOREIGN PATENT DOCUMENTS

| JP | 8-194201 A | 7/1996 |
| JP | 2005-121249 A | 5/2005 |
| JP | 2005-121250 A | 5/2005 |

* cited by examiner

*Primary Examiner* — Georgia Y Epps
*Assistant Examiner* — Sultan Chowdhury
(74) *Attorney, Agent, or Firm* — ALG Intellectual Property, LLC

(57) ABSTRACT

A liquid crystal projector includes a light modulating device, a cooling device, a dehumidification device, and a housing. The light modulating device forms an optical image by modulating light flux emitted from a light source based on image information. The cooling device cools air to be supplied to the light modulating device. The dehumidification device dehumidifies and dries air to be supplied to the corresponding cooling device. The housing includes a cooling medium flow path for circulating air among the light modulating device, the cooling device, and the dehumidification device. The cooling device includes a thermoelectric conversion material interposed between a pair of heat transmission plates arranged to face each other.

7 Claims, 4 Drawing Sheets

LIQUID CRYSTAL PROJECTOR

BACKGROUND

1. Technical Field

The present invention relates to a liquid crystal projector that enlarges and displays images on a screen or the like, and, more particular, to a cooling technique of a liquid crystal projector.

2. Related Art

In a projection liquid crystal projector of the related art, an optical image (image light) is formed by a light modulating device, for example, a liquid crystal panel, that modulates light flux emitted from a light source based on image information, and an image is displayed by projecting the image light on a screen or the like. With respect to a lamp, for example, a halogen lamp, which is used for a light source, generates a large amount of heat when the light source light is irradiated. Therefore, when a liquid crystal panel exceeds an allowable temperature due to the strong heat of a light source, display properties deteriorate and the life span thereof becomes short.

In particular, in recent years, there is a tendency to use a light source lamp which has larger output in order to increase the luminance of a projection image, and thus it is necessary to further improve the cooling efficiency of a cooling device built in a liquid crystal projector.

In the related art, a cooling device built in such a liquid crystal projector generally includes a cooling fan that blows outside air into a liquid crystal panel. However, if the amount of blowing is increased by increasing the rotation speed of a cooling fan or the size of the fan with the increase in the output of the light source lamp as described above, the noise or the vibration of the liquid crystal projector increases, so that the amenity of the installation environment is impaired and the components of the liquid crystal projector are adversely affected.

Therefore, for example, JP-A-8-194201 discloses a liquid crystal projector in which a thermoelectric conversion material, for example, a Peltier element, is provided in a cooling device, and heat in the housing of the liquid crystal projector is absorbed, thereby improving cooling efficiency. Therefore, cooling can be effectively performed even though the size and the rotation speed of a cooling fan are not increased.

However, as in the liquid crystal projector disclosed in JP-A-8-194201, if a Peltier element is used in a cooling device, there is a problem in that dew condensation easily occurs in the cooling side (low temperature section) of the Peltier element. In particular, condensed water drops increase in summer when the outside humidity increases, and water drops are scattered by a cooling fan, so that there are problems in that the liquid crystal panel may be polluted and electrical failure may occur.

SUMMARY

An advantage of some aspects of the invention is to provide a liquid crystal projector in which the pollution of components or the generation of failure attributable to water drops generated by dew condensation on a cooling device is prevented.

A liquid crystal projector according to an aspect of the invention is provided.

That is, a liquid crystal projector according to an aspect of the invention includes a light modulating device that forms an optical image by modulating light flux emitted from a light source based on image information; a cooling device that cools air to be supplied to at least the light modulating device; a dehumidification device that dehumidifies and dries air to be supplied to the corresponding cooling device; and a housing that includes a cooling medium flow path for circulating air among the light modulating device, the cooling device, and the dehumidification device. The cooling device includes a thermoelectric conversion element having a thermoelectric conversion material interposed between a pair of heat transmission plates which are arranged to face each other, and configured to have one side heat transmission plate functioning as a low temperature section and the other side transmission plate functioning as a high temperature section when a voltage is applied to the thermoelectric conversion material.

According to the liquid crystal projector, water of air to be cooled by the thermoelectric conversion material is removed beforehand by the dehumidification device. Therefore, even though air sucked from the outside comes in contact with the low temperature section of the thermoelectric conversion material, the water of the air is almost completely removed by the dehumidification device, so that water is not condensed and dew condensation is not generated in the low temperature section of the thermoelectric conversion material. Therefore, the scattering of condensed water drops through the cooling medium flow path, the pollution of the light modulating device, and the generation of electrical failure can be reliably prevented.

It is preferable that the thermoelectric conversion element include the one side heat transmission plate exposed to the inside of the housing, and the other side heat transmission plate exposed to the outside of the housing. Therefore, the cooling efficiency of air which flows through the cooling medium flow path can be increased.

It is preferable that the dehumidification device be formed in an area corresponding to the front stage side of the cooling device of the cooling medium flow path and the rear stage side of the light modulating device. Therefore, the dehumidification efficiency of air which flows through the cooling medium flow path can be further increased.

It is preferable that the other side heat transmission plate be further connected to a heat sink that promotes radiation. Therefore, the heat exchange efficiency of the thermoelectric conversion material can be increased.

It is preferable that the liquid crystal projector further include a cooling fan that blows air to the heat sink and promotes the radiation of the heat sink. Therefore, the heat exchange efficiency of the thermoelectric conversion material can be further increased.

It is preferable that the dehumidification device be a rotor-type dehumidification device. Therefore, the liquid crystal projector which prevents the dew condensation in the housing can be a small size and lightweight.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a liquid crystal projector according an embodiment of the present invention will be described with reference to the accompanying drawings. Meanwhile, the present embodiment is described in detail in order to understand the gist of the invention better, and does not limit the invention unless otherwise stated. Further, with respect to the drawings which will be used for description below, an important part may be enlarged and then illustrated for convenience in order to facilitate understanding of the feature of the invention, and the ratio of the dimensions of each component is not limited to be the same as in reality.

Figure 1:
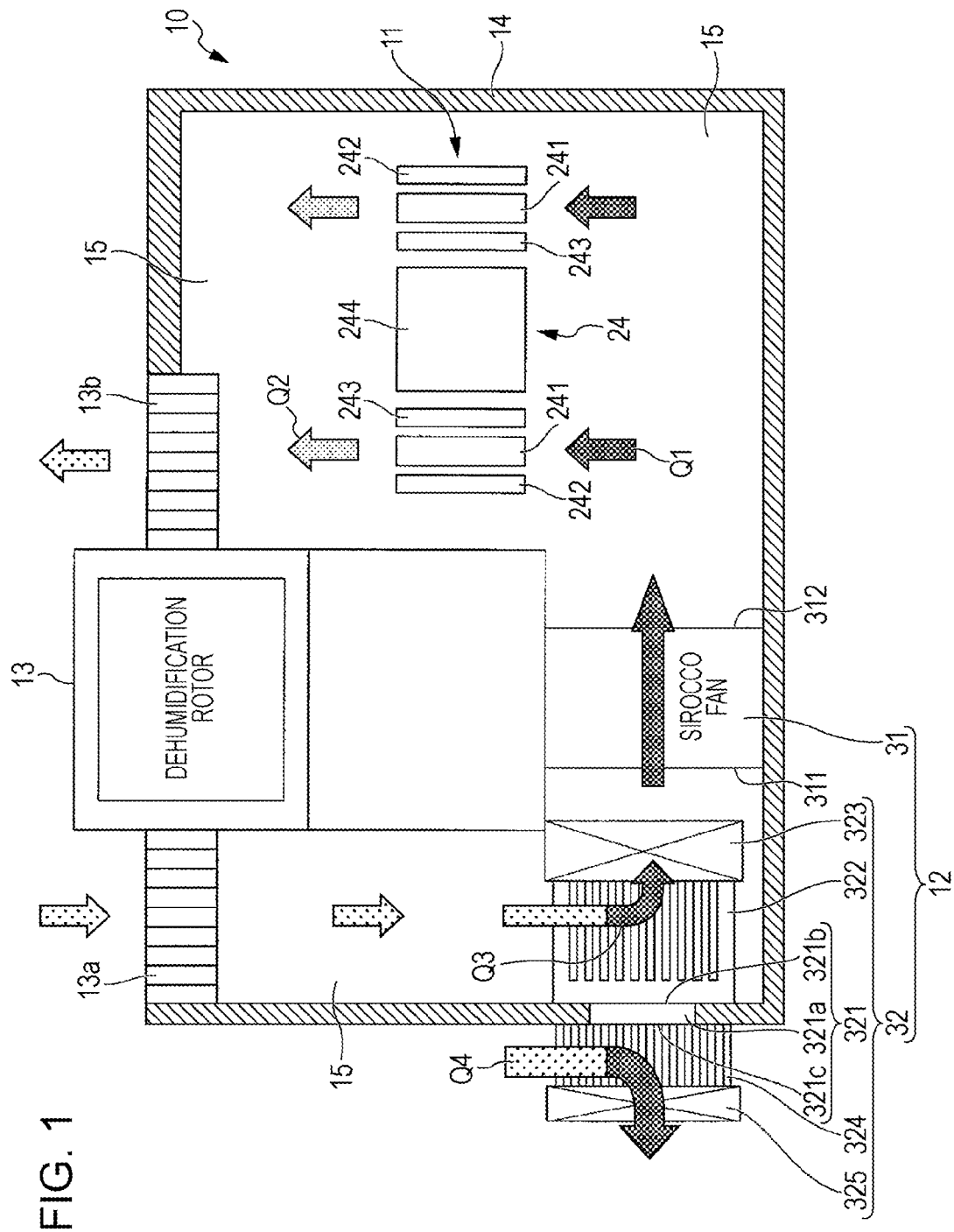
FIG. 1 is a cross-sectional view illustrating an example of a liquid crystal projector according to an embodiment of the invention.

FIG. 1 is a cross-sectional view illustrating the outline of a liquid crystal projector according to an embodiment of the invention.

A liquid crystal projector 10 includes a light modulating device 11, a cooling device 12, a dehumidification device 13, and a housing 14 that accommodates the light modulating device 11, the cooling device 12, and the dehumidification device 13. Further, a cooling medium flow path 15 is formed in the housing 14.

Figure 2:
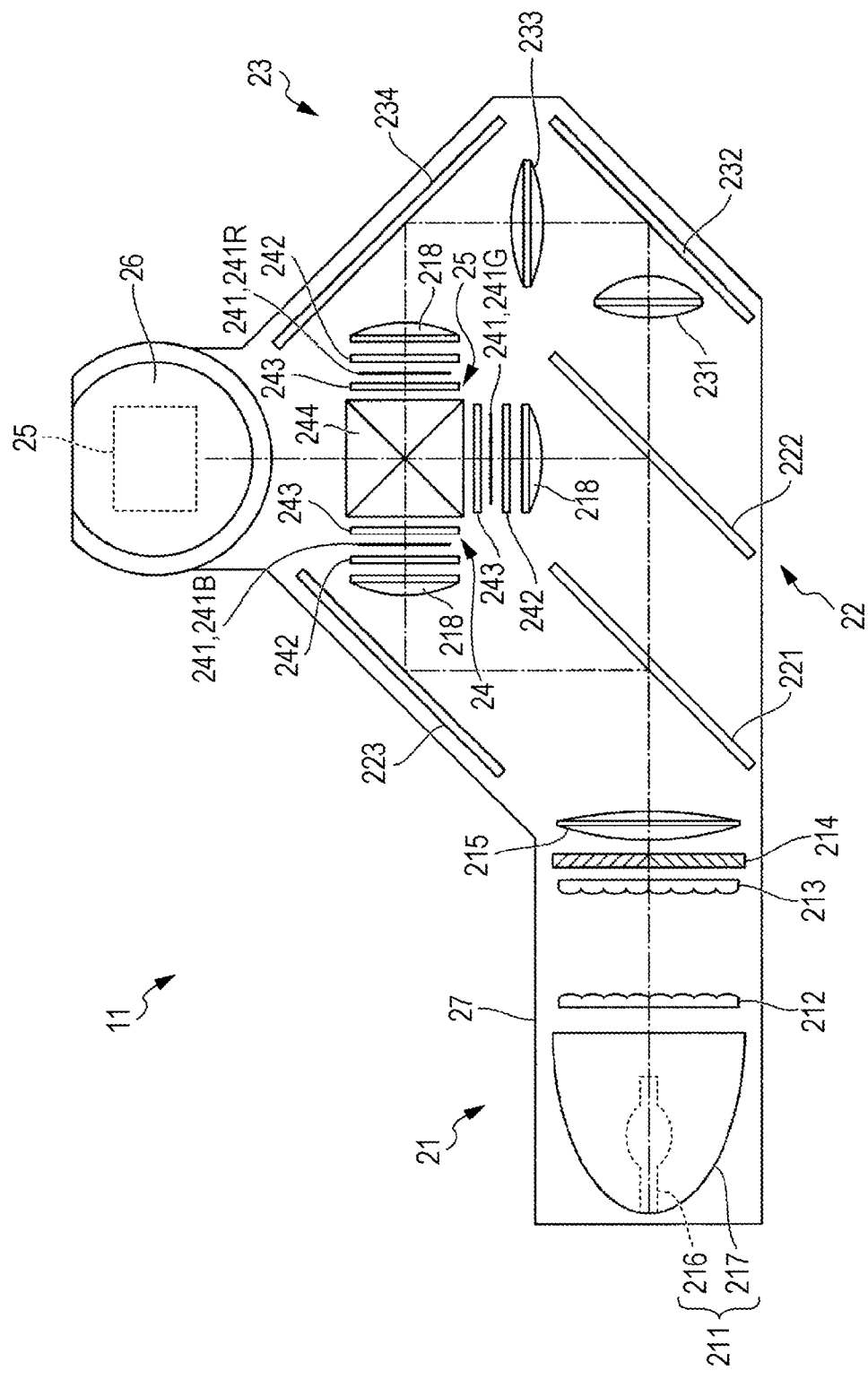
FIG. 2 is a cross-sectional view illustrating a light modulating device.

As shown in FIG. 2, the light modulating device 11 optically processes light flux emitted from a light source lamp, forms an optical image based on image information, and enlarges and projects the optical image. The light modulating device 11 includes an integrator illumination optics 21, a color division optics 22, a relay optics 23, an optical device 24, a prism 28, a projection lens 26 functioning as projection optics, and a light guide 27.

The integrator illumination optics 21 is an optics used to substantially uniformly illuminate the image formation area of three liquid crystal panels 241 that constitute the optical device 24 and will be described later. The integrator illumination optics 21 includes a light source device 211, a first lens array 212, a second lens array 213, a polarization conversion element 214, and a superimposing lens 215.

The light source device 211 includes a light source lamp (light source) 216 functioning as an irradiation source and a reflector 217, reflects a radial light beam emitted from the light source lamp 216 using a reflector 217 so that the radial light beam becomes a parallel light beam, and emits the parallel light beam to the outside, for example, toward a screen.

As the light source lamp 216, for example, a halogen lamp may be used. Meanwhile, a metal halide lamp or a high-pressure mercury lamp may be used other than the halogen lamp.

As the reflector 217, a paraboloidal mirror is used. Meanwhile, instead of the paraboloidal mirror, a mirror which combines a collimating concave lens and an ellipsoidal mirror may be used.

The first lens array 212 has a configuration in which small lenses, which have a substantially rectangular outline viewed from the optical axis direction, are arranged in a matrix shape. Each of the small lenses divides the light flux emitted from the light source lamp 216 into a plurality of partial light flux.

The second lens array 213 has substantially the same configuration as that of the first lens array 212, and has a configuration in which small lenses are arranged in a matrix shape. The second lens array 213 has a function of focusing the image of each of the small lenses of the first lens array 212 on the liquid crystal panel 241, which will be described later, together with the superimposing lens 215.

The polarization conversion element 214 is disposed between the second lens array 213 and the superimposing lens 215, and is unitized with the second lens array 213 in a single body. The polarization conversion element 214 converts light from the second lens array 213 into substantially one type of polarization light, so that the light use efficiency in the optical device 24 increases.

In particular, each partial light converted into substantially one type of polarization light by the polarization conversion element 214 is finally almost superimposed on a liquid crystal panel 241 of the optical device 24, which will be described later, by the superimposing lens 215. Since only one type of polarization light can be used in the liquid crystal projector 10 using the liquid crystal panel 241 which modulates polarization light, it is difficult to use almost half of the light from the light source lamp 216 that emits other types of random polarization light. Therefore, using the polarization conversion element 214, light flux emitted from the light source lamp 216 is converted into substantially one type of polarization light, and the light use efficiency in the optical device 24 increases.

The color division optics 22 includes two pieces of dichroic mirrors 221 and 222 and a reflection mirror 223, and has a function of dividing the plurality of partial light flux emitted from the integrator illumination optics 21 into three pieces of color light, that is, Red (R), Green (G), and Blue (B), using the dichroic mirrors 221 and 222.

The relay optics 23 includes an incident side lens 231 and a relay lens 233, and reflection mirrors 232 and 234, and has a function of guiding red light which is the color light divided by the color division optics 22 to the red-light liquid crystal panel 241R of the optical device 24, which will be described later.

At this time, the dichroic mirror 221 of the color division optics 22 transmits the red light component and the green light component of the light flux emitted from the integrator illumination optics 21, and reflects the blue light component thereon. The blue light reflected by the dichroic mirror 221 is reflected on the reflection mirror 223, passes through the field lens 218, and reaches the blue-light liquid crystal panel 241B of the optical device 24, which will be described later. The field lens 218 converts each partial light flux emitted from the second lens array 213 as light flux which is parallel to the central axis (principal ray) thereof. The field lenses 218 provided in the light flux incident sides of the green-light and red-light liquid crystal panels 241G and 241R have the same configuration.

Further, the green light between the red light and the green light which is transmitted through the dichroic mirror 221 is reflected on the dichroic mirror 222, passes through the field lens 218, and reaches the green-light liquid crystal panel 241G. On the other hand, red light is transmitted through the dichroic mirror 222, passes through the relay optics 23, passes through the field lens 218, and reaches the red-light liquid crystal panel 241R.

Meanwhile, the reason that the relay optics 23 is used for the red light is, since the length of light flow path of red light is longer than that of other colored light, to prevent the decrease in light use efficiency attributable to light dispersion or the like, that is, to transmit partial light flux incident on the incident side lens 231 to the field lens 218 without change. Meanwhile, although the relay optics 23 is configured to allow red light among the three types of color light to pass therethrough, the invention is not limited thereto. For example, the relay optics may be configured to allow blue light to pass therethrough.

The optical device 24 modulates incident light flux based on image information and forms a color image, and includes three incident-side polarization plates 242 on which each piece of color light divided by the color division optics 22 is incident, three liquid crystal panels 241 (241R, 241G, and 241B) functioning as the light modulating devices disposed on the back of the respective incident-side polarization plates 242, three emitting-side polarization plates 243 disposed on the back of the respective liquid crystal panels 241, and a cross dichroic prism 244 functioning as a color composition optical device.

The liquid crystal panels 241 (241R, 241G, and 241B) use, for example, a polysilicon Thin-Film Transistor (TFT) as a switching element. With respect to the optical device 24, each piece of color light, divided by the color division optics 22, is modulated by the three pieces of liquid crystal panels 241R, 241G, and 241B, the incident-side polarization plate 242, and the emitting-side polarization plate 243 based on the image information, thereby forming an optical image.

The incident-side polarization plate 242 transmits only polarization light in the predetermined direction among the respective pieces of color light divided by the color division optics 22, and absorbs other light flux, and a polarization film is attached on a substrate such as a sapphire glass.

The emitting-side polarization plate 243 is configured in substantially the same way as the incident-side polarization plate 242, transmits only polarization light in the predetermined direction from among light flux emitted from the liquid crystal panel 241, and absorbs other light flux.

The incident-side polarization plate 242 and the emitting-side polarization plate 243 are set such that the directions of the polarization axes thereof are orthogonal to each other.

The cross dichroic prism 244 forms a color image by synthesizing optical images emitted from the emitting-side polarization plates 243 and modulated for the respective pieces of color light. In the cross dichroic prism 244, a dielectric multilayer which reflects red light and a dielectric multilayer which reflects blue light are provided in a substantially X-character shape along the four boundary surface of a rectangular prism, and three pieces of color light are synthesized by those dielectric multilayers.

The liquid crystal panel 241, the emitting-side polarization plate 243, and the cross dichroic prism 244, which are included in the optical device 24, are unitized in a single body, so that the optical device body 25 is formed.

The prism 28 is disposed on the light flux emitting side of the optical device 24 and configured to reflect a color image formed using the optical device 24 in the direction of the projection lens 26, that is, configured to bend the color image emitted in the forward direction to the upper direction and reflect it.

The projection lens 26 enlarges the color image reflected by the prism 28 and projects the enlarged color image. The projection lens 26 is configured as a coupling lens in which a plurality of lenses are stored in a lens tube.

The light guide 27 is formed of a synthetic resin and configured to store and hold the above-described respective optics 21 to 25, and 28, and include a lower light guide in which a groove portion into which the respective optical components 212 to 215, 218, 221 to 223, and 231 to 234 are inserted from the upper side in a sliding manner is formed and a roof-shaped upper light guide which blocks the upper opening side of the lower light guide although the detailed graphic display is omitted.

With reference to FIG. 1 again, the cooling device 12 includes a sirocco fan 31 that blows cooling air to the optical device 24 and a cooling unit 32 that cools the air to be sucked by the sirocco fan 31. Further, the sirocco fan 31 and the optical device 24 to be cooled are closed and housed by the housing 14. Further, a dehumidification device 13 which will be described later includes one surface side exposed to the outside and the other surface side exposed to the inside of the housing 14.

The housing 14 includes a cooling medium flow path 15 partitioned therein, and closes and houses the sirocco fan 31 and the optical device 24 so that the sirocco fan 31 and the optical device 24 approach the cooling medium flow path 15. It is preferable that the inside of the housing 14 be covered by, for example, a heat insulation material. Therefore, the cooling medium flow path 15 is thermally blocked from the outside. As the heat insulation material, a material with a low thermal conductivity, for example, a cloth, paper, a plastic, felt, a rubber, cement, a glass fiber, polystyrene foam, or cork may be exemplified.

The sirocco fan 31 is provided as a blower module that circulates air in the cooling medium flow path 15, and arranged in such a way that an absorption surface 311 faces the cooling unit 32 and a discharge surface 312 faces the optical device 24. As the blower module used here, an axial stream fan may be provided in addition to the sirocco fan.

However, since cooled air blows on the optical device 24 disposed in the location separated from the sirocco fan 31, high discharge pressure is requested for the cooled air which blows from the fan. Therefore, although it is necessary to increase the size and the rotation speed of the fan in order to obtain high discharge pressure in an axial stream fan, noise, such as wind noise or the like, or power consumption generated by the fan increases in this case. In contrast, when the sirocco fan is used, the sirocco fan has a high discharge pressure for the blown air and excellent quietness, so that the above-described problem does not occur. Therefore, the sirocco fan is used in the embodiment.

The cooling unit 32, included in the cooling device 12, cools the air supplied to the optical device 24 by the sirocco fan 31, and includes a Peltier element 321 as a thermoelectric conversion element.

The Peltier element 321 in the present embodiment uses a π-type Peltier element, and a P-type semiconductor element and an N-type semiconductor element which function as thermoelectric conversion materials are disposed between a pair of heat transmission plates placed opposite to each other, and wiring patterns in which P-type and N-type semiconductor elements are connected with each other in series are formed on a surface to which the semiconductor elements of the pair of heat transmission plates are connected.

When voltage is applied to the voltage application terminal 321a of the Peltier element 321, the heat of one heat transmission plate of the junction surface flows to the other heat transmission plate, so that one heat transmission plate, that is, a low temperature section 321b, has an operation of absorbing heat, and the other heat transmission plate, that is, a high temperature section 321c, has an operation of emitting heat. That is, cooled air supplied to the sirocco fan 31 is cooled by the low temperature section 321b, and heat absorbed from the cooled air is emitted by the high temperature section 321c.

A heat sink (radiator plate) 322 which is a radiator plate and a cooling fan 323 attached to the end portion of the heat sink 322 are attached to the low temperature section 321b. Here, the low temperature section 321b is exposed so as to face the cooling medium flow path 15 partitioned by the housing 14, and the heat sink 322 and the cooling fan 323 are housed in the cooling medium flow path 15.

The heat sink 322 is a fin-shaped member which is projected in the out-of-plane direction of the low temperature section 321b and configured to promote the heat exchange with air which comes in contact thereto. The heat sink 322 is provided to cover the low temperature section 321b, thereby enlarging the dimension which comes in contact with air and implementing air cooling with high efficiency.

The cooling fan 323 blows the air which comes into contact with the heat sink 322 and is cooled to the absorption surface 311 of the sirocco fan 31 such that the sirocco fan 31 easily sucks or discharges air. Further, the axial stream fan 323 stirs the space ranging from the low temperature section 321b to the absorption surface 311 of the sirocco fan 31, so that the temperature of air to be sucked by the sirocco fan 31 is set to be uniform, and partial temperature distribution, such as cold air accumulation, is not generated. Therefore, the discharge surface of the cooling fan 323 is disposed to face the absorption surface 311 of the sirocco fan 31. Furthermore, the cooling fan 323 assists the circulation of air of the cooling medium flow path 15 performed by the sirocco fan 31, and enables air in the cooling medium flow path 15 to smoothly flow.

The high temperature section 321c of the Peltier element 321 is exposed to the outside air of the housing 14, that is, the outside of the cooling medium flow path 15, as described above. The high temperature section 321c has substantially the same configuration as that of the low temperature section 321b, and includes a heat sink 324 functioning as another fan-shaped member and a cooling fan 325 attached to the heat sink 324. The cooling fan 325 cools heat absorbed from air in the cooling medium flow path 15 at the low temperature section 321b and conducted to the high temperature section 321c. As described above, the cooling of air in the low temperature section 321b is prompted by promoting the cooling of the high temperature section 321c together with the heat sink 324 that enlarges the area which comes into contact with air and promotes heat exchange. In the high temperature section 321c of the Peltier element 321, air supplied for cooling performed in the high temperature section 321c rises along the direction of the flow path Q4, and is gradually cooled by the cooling fan 325.

The dehumidification device 13 is formed on a path through which outside air flows from the outside of the housing 14 to the cooling unit 32, that is, the front stage of the cooling unit 32 included in the cooling device 12 of the cooling medium flow path 15, and on a flow path through which the outside air flows from the optical device 24 to the outside of the housing 14, that is, on the rear stage of the light modulating device 11. The dehumidification device 13 includes a processing zone 13a that removes, for example, water (moisture) included in air which is introduced from the outside, and a regeneration zone 13b.

Figure 3:
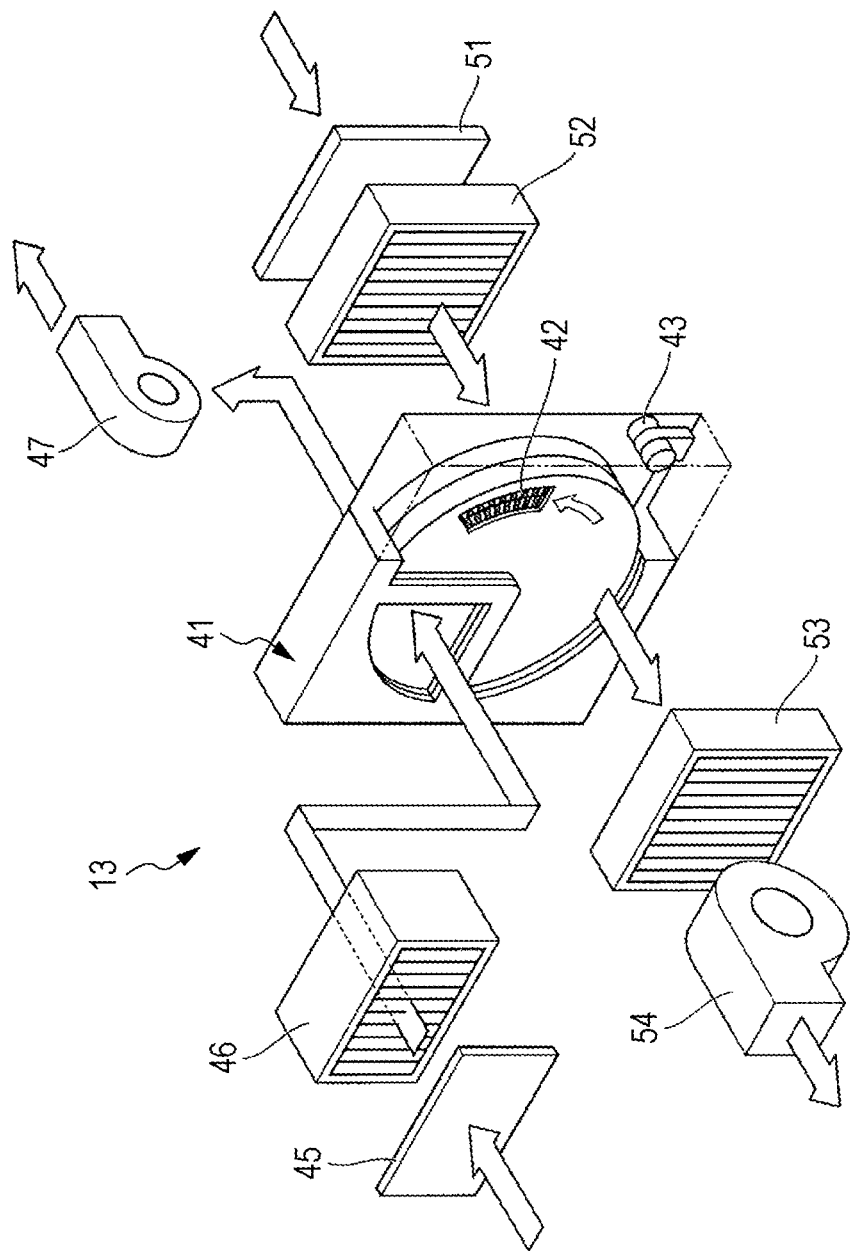
FIG. 3 is an exploded perspective view illustrating an example of a dehumidification device.

FIG. 3 is an exploded perspective view illustrating an example of the dehumidification device.

A rotor-type dehumidification device, which can be a small size and lightweight, is preferably used as the dehumidification device 13. The dehumidification device 13 includes a rotor casing 41. The rotor casing 41 is divided into the processing zone 13a and the regeneration zone 13b. A porous rotor 42 that adsorbs an adsorbent material is formed in the rotor casing 41. The rotor 42 rotates in the rotor casing 41 using a motor 43.

The air of the cooling medium flow path 15 (refer to FIG. 2) is guided to the rotor 42 which is being rotated in the processing zone 13a, and water thereof passing through the rotor 42 is adsorbed and dehumidified. The rotor 42 which adsorbed water is moved to the regeneration zone 13b, so that water adsorbed to the rotor 42 is evaporated and dried by air passed through the filter 45 and heated using a heater unit 46. The air used to dry the rotor 42 is discharged by the discharge fan 47.

It is preferable that a filter 51, a pre-cooler 52, an after-cooler 53, and a blower 54 that promotes the outflow of air dehumidified in the processing zone 13a be additionally formed in the front and rear of the processing zone 13a of the cooling medium flow path 15.

The operation of the liquid crystal projector (cooling mechanism) having the above-described configuration according to the embodiment of the invention will be described with reference to FIG. 1.

The liquid crystal projector 10 brings outside air from the processing zone 13a of the dehumidification device 13 exposed to the outside of the housing 14. The brought outside air is dehumidified when the outside air passes through the processing zone 13a of the dehumidification device 13. The dry air which is dehumidified by the dehumidification device 13 flows along the flow path Q3 of the cooling medium flow path 15, and comes in contact with the heat sink 322 attached to the low temperature section 321b of the Peltier element 321, so that the heat of the air is absorbed and the air is cooled. The cooled air is discharged toward the absorption surface 311 of the sirocco fan 31 by the cooling fan 323.

The water of the outside air cooled by the Peltier element 321 is removed by the dehumidification device 13 before the outside air comes in contact with the low temperature section 321b of the Peltier element 321. Therefore, since the water of the brought outside air is almost completely removed by the dehumidification device 13, water is not cohered and dew condensation does not occur in the heat sink 322. Therefore, the pollution of the optical device 24 or the generation of electrical failure due to the condensed water drops scattered by the cooling fan 233 can be reliably prevented.

The sirocco fan 31 sucks the cooled air from the absorption surface 311, and discharges the cooled air toward the light modulating device 11. The dry cooled air discharged by the sirocco fan 31 flows along the flow path Q1 of the cooling medium flow path 15, and cools the optical device 24 included in the light modulating device 11.

Since water is removed by the dehumidification device 13, and the optical device 24 is cooled by the cooled air which is cooled and dried in the low temperature section 321b of the Peltier element 321 as described above, the heat generation of the optical device 24 can be suppressed, and the mist of the optical device 24 attributable to moisture and the generation of electrical failure can be reliably prevented.

Air warmed by cooling the optical device 24 is discharged to the optical device 24 via the flow path Q2, that is, discharged to the outside of the housing 14 via the regeneration zone 13b of the dehumidification device 13 disposed in the rear stage side of the light modulating device 11. At this time, water adsorbed in the rotor 42 (refer to FIG. 3) is evaporated and dried in such a way that dry air which is warmed by cooling the optical device 24 passes through the regeneration zone 13b. Therefore, the rotor 42 can efficiently adsorb (dehumidify) the water of the outside air in the processing zone 13a again.

Figure 4:
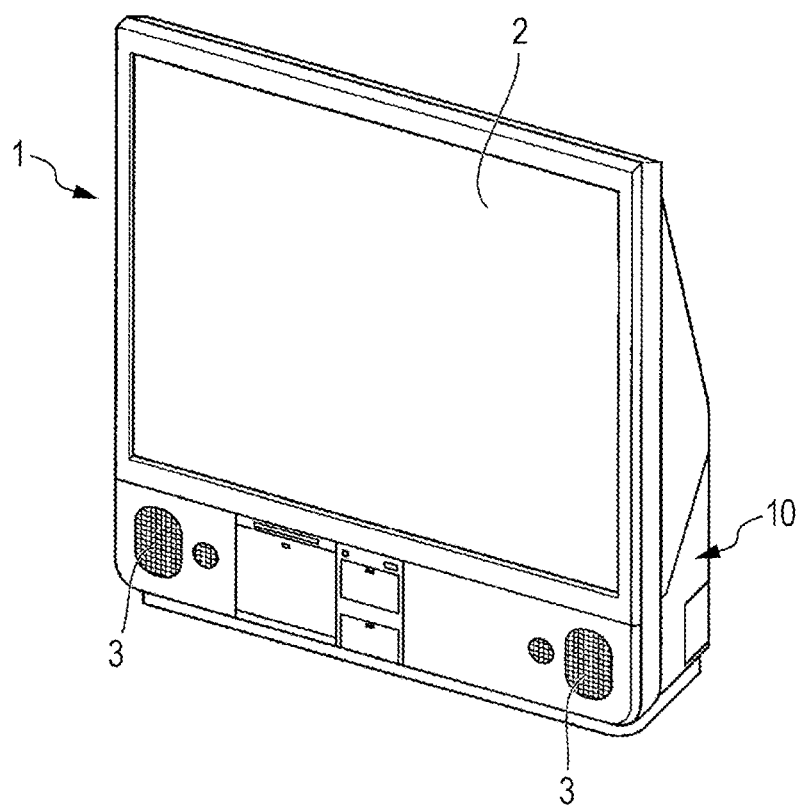
FIG. 4 is a perspective view illustrating the exterior of a rear projector which is the application of the liquid crystal projector according to the embodiment of the invention.

A rear projector which is an application of the above-described liquid crystal projector according to the embodiment of the invention is shown in FIG. 4.

A rear projector 1 forms an optical image by modulating light flux emitted from a light source based on image information, enlarges the optical image and projects the enlarged optical image on a screen 2. In the rear projector 1, a stereo speaker or the like is formed in a cabinet 3 and the liquid crystal projector 10 as described above is built in the cabinet.

The entire disclosure of Japanese Patent Application No. 2010-084911, filed Apr. 1, 2010 is expressly incorporated by reference herein.

What is claimed is:

1. A liquid crystal projector comprising:
a light modulating device that forms an optical image;
a cooling device that cools the light modulating device; and
a dehumidification device that electrically dehumidifies air during operation of the cooling device,
wherein:
the dehumidification device has an inlet port and an outlet port,
the inlet port connects to a front stage side of the cooling device, and
the outlet port connects to a rear stage side of the light modulating device.

2. The liquid crystal projector according to claim 1, wherein:
the cooling device has a first cooling fan that blows air to the light modulating device.

3. The liquid crystal projector according to claim 2, wherein:
the cooling device has a thermoelectric conversion element that transmits a heat when a voltage is applied to the thermoelectric conversion element.

4. The liquid crystal projector according to claim 3, wherein:
the dehumidification device is a rotor-type dehumidification device that electrically rotates an adsorbent rotor.

5. The liquid crystal projector according to claim 3, wherein:
the thermoelectric conversion element has a heat sink that promotes radiation.

6. The liquid crystal projector according to claim 5, further comprising:
a second cooling fan, being disposed between the cooling device and the dehumidification device, that blows air to the heat sink and promotes radiation of the heat sink.

7. A liquid crystal projector comprising:
a light modulating device that forms an optical image;
a cooling device that cools the light modulating device and includes
a first cooling fan that blows air to the light modulating device, and
a thermoelectric conversion element that transmits a heat when a voltage is applied to the thermoelectric conversion element, the thermoelectric conversion element having a heat sink that promotes radiation;
a dehumidification device that electrically dehumidifies air during operation of the cooling device; and
a second cooling fan, being disposed between the cooling device and the dehumidification device, that blows air to the heat sink and promotes radiation of the heat sink.

* * * * *